(12) United States Patent
Gupta et al.

(10) Patent No.: US 8,637,718 B2
(45) Date of Patent: Jan. 28, 2014

(54) BIOMASS TO BIOCHAR CONVERSION IN SUBCRITICAL WATER

(75) Inventors: Ram B. Gupta, Auburn, AL (US);
Sandeep Kumar, Auburn, AL (US);
Lingzhao Kong, Auburn, AL (US)

(73) Assignee: Auburn University, Auburn, AL (US)

( * ) Notice: Subject to any disclaimer, the term of this patent is extended or adjusted under 35 U.S.C. 154(b) by 706 days.

(21) Appl. No.: 12/875,549

(22) Filed: Sep. 3, 2010

(65) Prior Publication Data
US 2011/0179703 A1 Jul. 28, 2011

Related U.S. Application Data

(60) Provisional application No. 61/245,911, filed on Sep. 25, 2009.

(51) Int. Cl.
*C07C 1/00* (2006.01)
(52) U.S. Cl.
USPC ............. 585/242; 202/96; 202/117; 202/118; 210/749; 210/761; 210/774
(58) Field of Classification Search
USPC .................. 585/240, 242; 202/96, 117, 118; 44/605; 210/749, 761, 774
See application file for complete search history.

(56) References Cited

U.S. PATENT DOCUMENTS

| | | | | |
|---|---|---|---|---|
| 7,547,539 B2 * | 6/2009 | Ikegami et al. | ............ | 435/289.1 |
| 7,691,159 B2 * | 4/2010 | Li | .................. | 44/605 |
| 7,955,508 B2 * | 6/2011 | Allan et al. | .................... | 210/749 |
| 8,119,823 B2 * | 2/2012 | Kilambi | ........................ | 549/489 |
| 8,216,430 B2 * | 7/2012 | Cheiky | ........................ | 202/216 |
| 2010/0050502 A1 * | 3/2010 | Wu et al. | ........................ | 44/308 |

FOREIGN PATENT DOCUMENTS

| | | | |
|---|---|---|---|
| WO | WO 01/96247 | * | 12/2001 |
| WO | 2008095589 A1 | | 8/2008 |
| WO | 2009090072 A1 | | 7/2009 |

OTHER PUBLICATIONS

Athika Chuntanapum and Yukihiko Matsumura, 2009, Formation of Tarry Material from 5-HMF in Subcritical and Supercritical Water. Ind. Eng. Chem. Res. Doi 10.1021/ie900423g.

Bo Hu, Shu-Hong Yu, Kan Wang, Lei Liu and Xue-Wei Xu. Functional carbonaceous materials from hydrothermal carbonization of biomass: an effective chemical process. Dalton Transactions. 2008, 5414-5423.

Yukihiko Matsumura, Mitsuru Sasaki. 2006. Supercritical water treatment of biomass for energy and material recovery. Combustion Science and Technology. 178 (1-3): 509-536.

Phillip E. Savage. 1999. Organic chemical reactions in supercritical water. Chemical Review. 99: 603-621.

Marta Sevilla and Antonio B. Fuertes. Chemical and structural properties of carbonaceous products obtained by hydrothermal carbonization of saccharides. Chem. Eur. J. 2009, 15, 4195-4203.

(Continued)

*Primary Examiner* — Nina Bhat
(74) *Attorney, Agent, or Firm* — Gardner Groff Greenwald & Villanueva, PC

(57) ABSTRACT

A method and system of converting biomass to biochar in a hydrothermal carbonization apparatus wherein subcritical water at a temperature of 230-350° C. and 500-3000 psi is reacted with the biomass to form biochar, biocrude and gases. The method and system include recycling the biocrude back to the hydrothermal carbonization apparatus which improves biochar yield and provides water for the biomass reaction to occur.

24 Claims, 4 Drawing Sheets

(56) References Cited

OTHER PUBLICATIONS

Marta Sevilla and Antonio B. Fuertes. The production of carbon materials by hydrothermal carbonization of cellulose. Carbon. 2009, 47, 2281-2289.

M. M. Titirici, M. Antoneietti, N. Baccile. Hydrothermal carbon from biomass: a comparison of the local structure from poly- to monosaccharides and pentoses/hexoses. Green Chemistry 2008. 10, 1204-1212.

* cited by examiner

BIOMASS TO BIOCHAR CONVERSION IN SUBCRITICAL WATER

CROSS-REFERENCE TO RELATED APPLICATION

This application claims the priority benefit of U.S. Provisional Patent Application Ser. No. 61/245,911, filed Sep. 25, 2009, which is hereby incorporated herein by reference.

TECHNICAL FIELD

The present invention relates generally to biochar and, in particular, to a method and system of efficiently converting biomass into biochar.

BACKGROUND

Biomass is made of organic compounds originally produced by absorbing atmospheric $CO_2$ during the process of plant photosynthesis. As long as the original biomass species are reproduced, cyclic follow of carbon dioxide and other forms of carbon that we use as energy or materials in the atmosphere can be realized. Since, theoretically, there is no net addition of $CO_2$ to the atmosphere in this cycle; biomass is considered one of the key sources of renewable energy in the sustainable society. In the past decades the interest to use biomass as energy and resource production has increased, as these may contribute considerably to the growing future energy and material demands. Energy and resource from biomass can additionally avoid the increase of carbon dioxide in the atmosphere and would help to reduce the greenhouse effect.

One of the most convenient methods to utilize biomass is by conversion to a hydrophobic solid with a high energy density. In traditional torrefaction processes, biomass is heated to 200-300° C. at near ambient pressure in the absence of oxygen to remove moisture and cause some carbonization. The torrified biomass has approximately 30% more energy density than the raw biomass. Typically, energy density can increase to about 18-20 MJ/kg (dry basis) from a biomass input of 17 MJ/kg (dry basis). But a significant loss of heating value occurs due to the evaporation of volatile organic matters, which gives a low energy yield. The chemical composition of torrefied wood is comparable to that of peat.

Recently, use of near critical water (or subcritical water) for carbonizing biomass has attracted lots of attention. Subcritical water serves as an excellent reactive medium due to its specific molecular properties. As compared to ambient water, subcritical water is significantly different in its dielectric constant, thermal conductivity, ion product, viscosity, and density. Subcritical water can efficiently solubilize many of the biomass components and react them without interfacial-transport limitations. A large portion of biomass wastes, e.g. from agriculture and food industries, is wet and contains a high amount of water. This wet biomass causes high drying costs if classical pyrolysis or gasification processes are used. The cost can be advantageously avoided by using subcritical or supercritical water.

When a biomass/water mixture is heated to 230-350° C. and 500-3000 psi (subcritical conditions), an insoluble carbon-rich black solid (biochar) and water-soluble products (biocrude) are obtained. This process is generally termed hydrothermal carbonization. The work in this area dates to as early as the first decades of the $20^{th}$ century, when the first research work on the hydrothermal carbonization of biomass was carried out to understand the mechanism of coal formation. The key focus was on the change in the oxygen/carbon and hydrogen/carbon atomic ratios upon the chemical transformation.

Past experiments have shown that when carrying out hydrothermal carbonization the oxygen/carbon and hydrogen/carbon ratios of carbon-rich solid product can be changed by modifying the treatment conditions. The product formation is the consequence of dehydration, condensation, or polymerization and aromatization reactions. Experiments have also shown that different sugar sources can have an effect on the structure of the solid product.

Current methods for the hydrothermal carbonization of biomass include converting the biomass together with water and at least one catalyst into substances such as coal, oil, and/or like substances of related type in a pressure vessel by temperature and/or pressure elevation. The biomass, water and/or catalyst is fed into the pressure vessel via a controllable inlet orifice, and the temperature and/or pressure conditions in the pressure vessel are controlled in such a manner that the biomass, water and catalyst react with one another and at least one reaction product is taken off via a controllable outlet orifice. To improve the hydrothermal carbonization of biomass, especially with regard to the duration of the conversion process and also the manner in which the process is carried out, the biomass is sometimes treated before and/or during the conversion by means of ultrasound, microwave radiation, or decompression.

In above traditional and new processes, some carbon is lost as water-soluble compounds giving a low energy yield of biochar. What is needed is a method and system for conversion of biomass to biochar that provides a higher biochar yield and reduction in the carbonization temperature.

Accordingly, it can be seen that needs exist for improved methods and systems that efficiently convert biomass to biochar. It is to the provision of these needs, among various others, that the present invention is primarily directed.

SUMMARY

The present invention is directed to both a method of and system for converting a biomass to a biochar. In one embodiment, a method of conversion of a biomass to a biochar is disclosed. Reaction of the biomass occurs in a hydrothermal carbonization apparatus. The products of the biomass reaction are separated and collected. These products include $CO_2$-rich gas, biochar, and biocrude. The biocrude product is then recycled back to the hydrothermal carbonization apparatus, where it provides water for the biomass reaction to occur.

In some embodiments, the hydrothermal carbonization apparatus is a subcritical water reactor. In other embodiments, the hydrothermal carbonization apparatus is used in batch or continuous mode. The mass ratio of the biomass and water/biocrude in the hydrothermal carbonization apparatus is most preferably in the range from 1:3 to 1:9; and the size of the biomass for hydrothermal carbonization is most preferably 1-20 mm long and 1-10 mm thin. In some embodiments, the method further includes using a raw biomass with 5-80 wt % moisture in the hydrothermal carbonization process and operating the apparatus at temperatures in the range of 230 to 350° C.

In some embodiments, the total residence time of the biomass and water/biocrude in the hydrothermal carbonization apparatus is in the range of 0.1 to 5 hours. In other embodiments, the hydrothermal carbonization apparatus is operated at pressure in the range of 500 to 3000 psi. In some embodiments, the method further includes releasing the $CO_2$-rich gas from an exhaust valve of the hydrothermal carbonization apparatus and separating the biocrude and biochar by a liquid/solid separator. In some embodiments, the pH of the biocrude for recycling is in the range of 2 to 7. In other embodiments, the organic carbon content of the biocrude for recycling is in the range of 0.5 to 10 wt %.

In another embodiment of the present invention, a system for converting a biomass to a biochar is taught. The system includes a hydrothermal carbonization apparatus for reacting a biomass and converting the biomass into biochar, biocrude and a $CO_2$-rich gas product; an exhaust valve for releasing the $CO_2$-rich gas product; a liquid/solid separator for separating the biochar and the biocrude; and a fluid line for recycling the biocrude product back to the hydrothermal carbonization apparatus.

The specific techniques and structures employed to improve over the drawbacks of the prior devices and accomplish the advantages described herein will become apparent from the following detailed description of example embodiments and the appended drawings and claims.

DETAILED DESCRIPTION OF EXAMPLE EMBODIMENTS

It is to be understood that this invention is not limited to the specific devices, methods, conditions, or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

Figure 1:
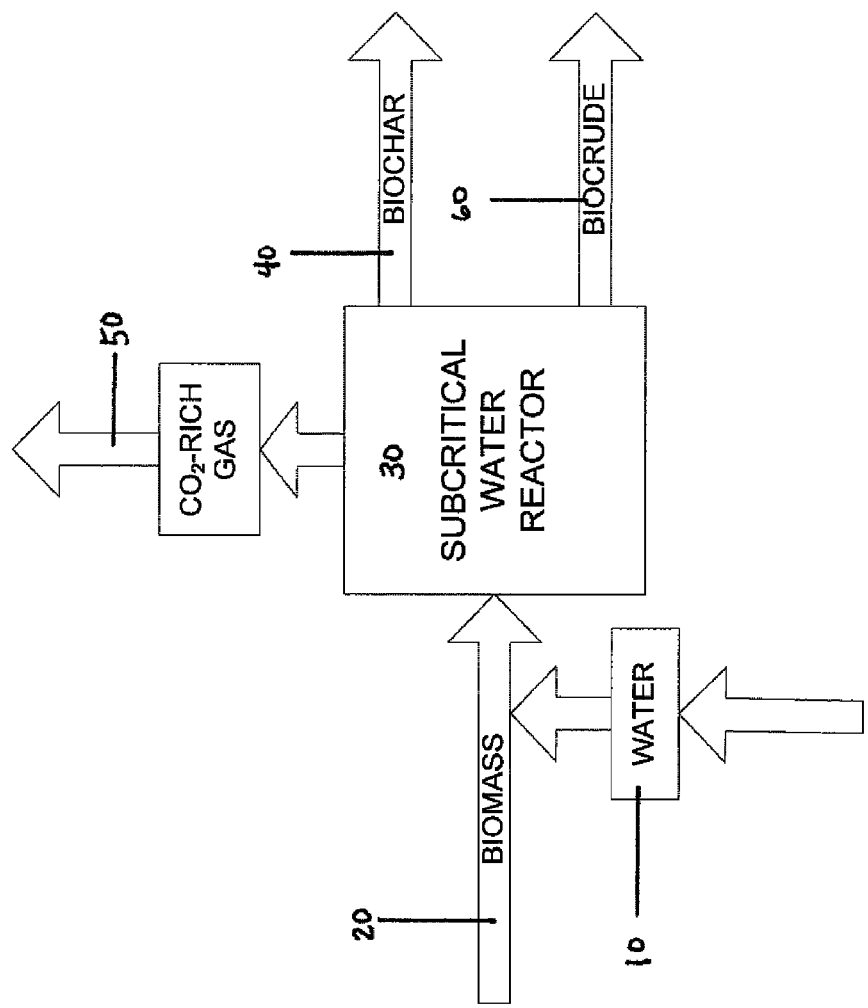
FIG. 1 is a schematic diagram depicting a prior art hydrothermal carbonization system for the formation of biochar.

With particular reference now to the drawing figures, FIG. 1 depicts a known system of hydrothermal carbonization. As shown in FIG. 1, known systems typically add water 10 and biomass 20 to a subcritical water reactor 30. Additionally, at least one catalyst is traditionally added to the water/biomass mixture before and/or after the introduction of the water/biomass mixture to the subcritical water reactor. Within the subcritical water reactor 30, biomass 20, water 10, and one or more catalysts react with each other to produce various byproducts. Most importantly, traditional processes result in the formation of biochar 40, which is a carbon-rich insoluble consumable fuel. Other byproducts include $CO_2$-rich gas 50 and biocrude 60. Unfortunately, the biocrude 60 that exits the subcritical water reactor 30 includes water-soluble carbon compounds. As a result, the biochar 40 produced by known systems has a lower energy yield than is desirable, as energy-rich carbon compounds are lost through the biocrude 60.

Figure 2:
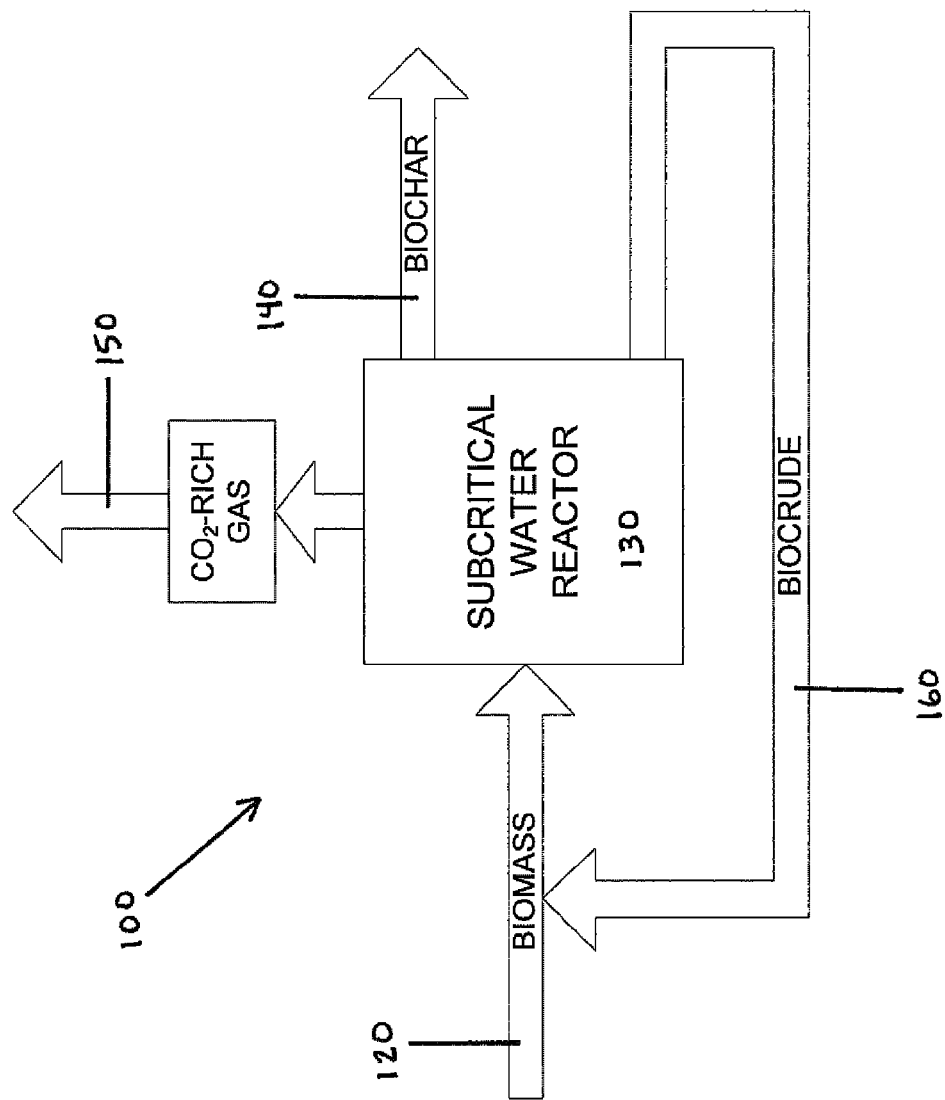
FIG. 2 is a schematic diagram depicting a hydrothermal carbonization system according to an example embodiment of the present invention.

The system 100 of the present invention is shown in FIG. 2, in accordance with one embodiment of the present invention. As such, biomass 120 is mixed with recycled biocrude 160 before being introduced into a subcritical water reactor 130 (or other hydrothermal apparatus). The biomass 120 used in conjunction with the system 100 of the present invention can include any plant-based organic compound(s), such as forestry or agricultural waste products, wood logs, wood slabs, wood chips, bark, corn-based products, wheat straw, nutshells, sugar cane, or any other compound that originated from plant photosynthesis. Generally, the biomass 120 and recycled biocrude 160 are injected into a hydrothermal carbonization apparatus and/or pressure vessel, and with the aid of at least one catalyst, is converted into consumable fuels such as coal, oil, and or other forms of biochar 140. In preferred example embodiments, the hydrothermal carbonization apparatus is a subcritical water reactor 130, as subcritical water has been discovered to serve as both a reactant and as a reaction medium. The subcritical water reactor 130 can be utilized in either batch or continuous mode. However, in alternate example embodiments, other hydrothermal carbonization apparatuses/pressure vessels known to one of ordinary skill in the art that utilize temperature and/or pressure elevations to convert carbon-based materials to biochar can be used in conjunction with the present invention.

In particular commercial embodiments, it has been found that subcritical water reactors formed from a pipe having at least one controllable inlet orifice and at least one controllable outlet orifice are effective in regulating the biomass conversion. Example embodiments include subcritical water reactors (or other hydrothermal carbonization apparatuses) that have at least one exhaust valve to provide for the release of $CO_2$-rich gas formed during the biomass conversion process. In still other example embodiments, the hydrothermal apparatus can include a liquid/solid separator to separate byproducts of the reaction. In particular example embodiments, the hydrothermal carbonization apparatus/subcritical water reactor is operated at temperatures of between about 230 to about 350 degrees C. and at pressures of between about 500 to about 3000 psi. Alternatively, other example embodiments can utilize a reactor that operates at a higher or lower temperature/pressure. Fluid lines and/or pipes can be utilized with the hydrothermal apparatus to move the biocrude through the system, including transferring the biocrude back into the hydrothermal carbonization apparatus.

In example embodiments of the system 100, biomass 120 having a moisture content of between about 5 wt % to about 80 wt %, and more preferably between about 5 wt % to about 60 wt %, is utilized for the conversion to biochar 140. Alternatively, biomass having more or less water content can also be utilized as desired. Moreover, specific example embodiments utilize biomass 120 that has been ground (or otherwise pieced) into particles between about 1 and 20 mm long and about 1 and 10 mm thick. Of course, larger or smaller biomass particles can be employed in conjunction with the present invention as desired.

Figure 3:
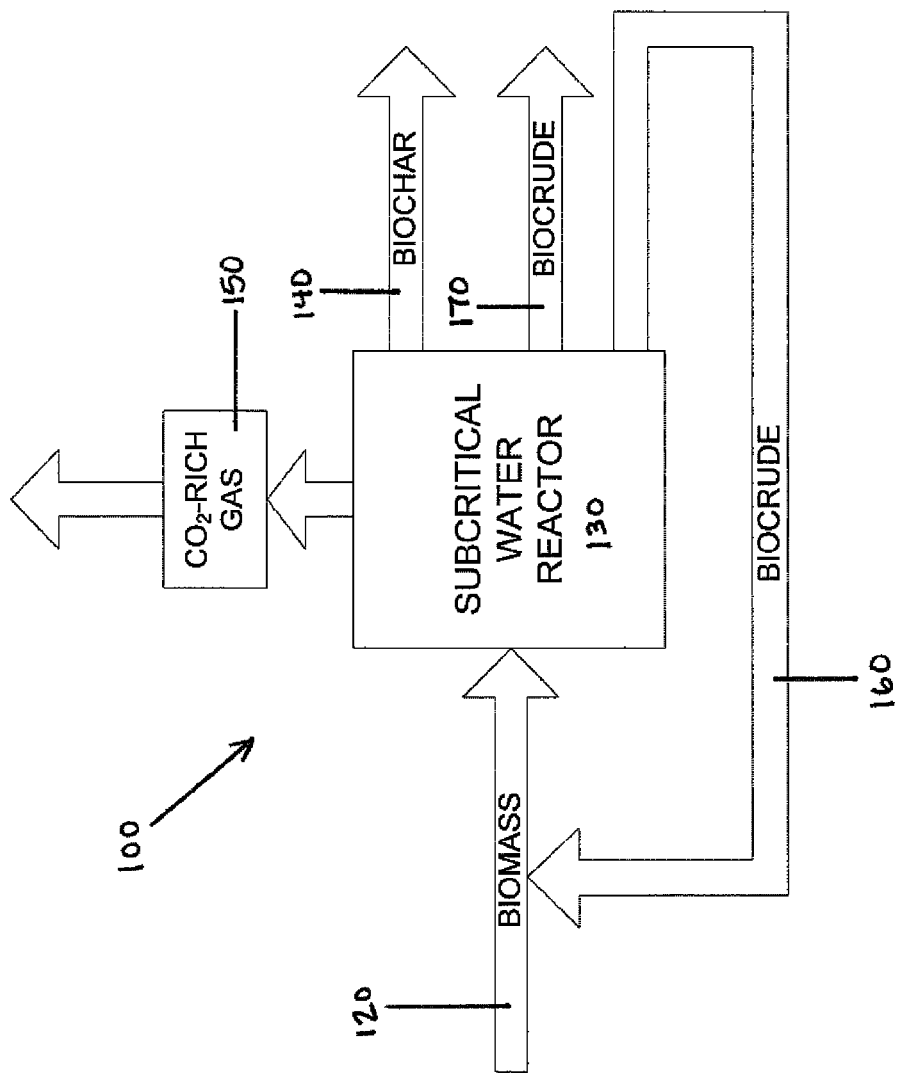
FIG. 3 is a schematic diagram depicting a hydrothermal carbonization system according to another example embodiment of the present invention.

Once the biomass has been introduced into the subcritical reactor 130 hemicelluloses (amorphous fractions of cellulose and lignin) within the biomass undergo hydrolysis at a lower temperature (about 150 to about 200 degrees C.), as the biomass 120 is heated within the subcritical water—forming water-soluble products such as sugars, furfural, organic acids, and acid soluble lignin derived compounds, among others. These various water-soluble compounds comprise much of the biocrude 160 that is then recycled back into the subcritical water reactor as seen in FIG. 2. While the example hydrothermal carbonization system depicted in FIG. 2 recycles all of the biocrude 160 back into the hydrothermal carbonization apparatus, alternative example embodiments can recycle only a portion of the biocrude. For example, another example embodiment of the system of the present invention is depicted in FIG. 3, in which a first portion of the biocrude 160 is recycled back into the hydrothermal carbonization apparatus and a second portion of the biocrude 170 is disposed of as desired. The biocrude 160 used for recycling generally has a pH of between about 2 and about 7 and the organic carbon content is in the range of about 0.5 wt % to about 10 wt %. Furthermore, it has been discovered that the small molecules within the biocrude byproduct 160, such as acetic acid, formic acid, lactic acid, other acids, and aldehydes, are intermediates of gaseous products such as CO, $CO_2$, and hydrocarbon gases. Additionally, ring compounds such as furfural, 5-HMF and phenolic compounds may be the precursor for tar formation via polymerization reaction. Due to this recycling of the biocrude 160, the majority of the organic compounds present in the aqueous phase are converted via a dehydration reaction to tar, which ultimately becomes part of the biochar 140. In example embodiments, the total residence time of the biomass feedstock 120 and the biocrude 160 in the hydrothermal carbonization apparatus is in the range of about 0.1 to about 5 hours. Alternatively, the biomass/biocrude mixture can be left in the hydrothermal carbonization apparatus for a longer time period as desired.

The complex chemistry of oxygenated hydrocarbons present in the aqueous phase help retain more than about 90% of the heating value of the biomass feedstock 120 as it is converted through the system 100 of the present invention into biochar 140. For example, at high temperatures, polymeric building blocks of biomass undergo crosslinking, deploymerization, and fragmentation. The dehydration of biomass due to such rearrangements helps in removing the oxygen from the biomass structure and increases the heating value of the same. As a result, in the hydrothermal carbonization process, most of the oxygen is removed as $H_2O$, which helps retain most of the carbon in the biochar byproduct 140. A small amount of oxygen is also removed as $CO_2$, which exits the subcritical water reactor 130 as $CO_2$-rich gas 150. Thus, the oxygen content of biochar 140 formed utilizing example system embodiments of the present invention can be reduced from 40 wt % (dry biomass) to about 21 wt %. Furthermore, biochar 140 produced according to such embodiments typically has a much lower H/C and O/C atomic ratios than the biomass feedstock 120.

Because the recycled biocrude contains about 95 wt % water, an additional benefit of the system 100 of the present invention is that example system embodiments generally do not need an additional water supply to reactor 130—as is required of known systems. As such, the system 100 of the present invention is well-suited for wet feedstocks such as freshly-chipped mixed-forest residues or other feedstock that contains a high amount of moisture. Occasionally, a small amount of make-up water can be added to dry biomass feedstock 120.

Figure 4:
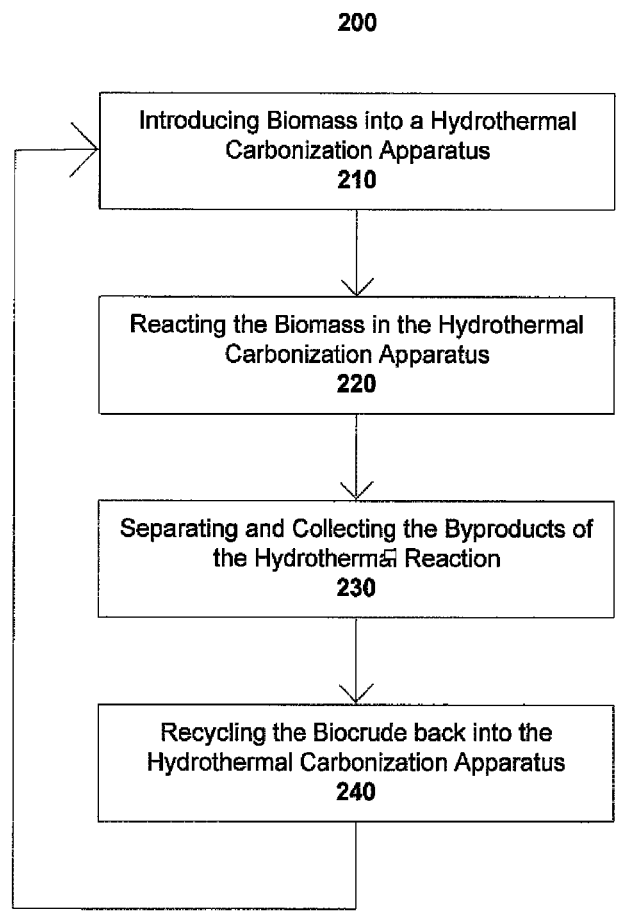
FIG. 4 is a flow chart of a method of creating biochar according to another example embodiment of the present invention.

The present invention also includes a method 200 of making biochar, as seen in FIG. 4. In general, the method 200 includes the steps of: introducing biomass into a hydrothermal carbonization apparatus 210, reacting the biomass in the hydrothermal carbonization apparatus 220, separating and collecting the byproducts of the hydrothermal reaction, including, but not limited to, $CO_2$-rich gas, biochar and biocrude 230, and recycling the biocrude back into the hydrothermal reaction 240. In particular example embodiments, the hydrothermal carbonization apparatus is a subcritical water reactor and can optionally be used in batch or continuous mode. Biomass, biocrude, and hydrothermal carbonization characteristics, compositions, temperatures, pressures, ranges etc., are the same for the method 200 as were described above in relation to the system 100 of the present invention.

EXAMPLES

The following examples are put forth so as to provide those of ordinary skill in the art with a complete disclosure and description regarding the systems and methods described and claimed herein, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

The efficacy of the present invention was tested in conjunction with the production of biochar from pine forest residue, which had an energy content of 19.6 MJ/kg (HHV-dry basis), carbon content of 45.5% (dry basis), and a moisture content of 55 wt %. The conversion was carried out at 300 degree C. for 30 minute reaction time using a batch reactor, while keeping the pressure above the vapor pressure of water. After the conversion, the biochar was collected and analyzed.

For the control experiment (without biocrude recycling, FIG. 1), biomass (40.9 g-dry basis) and water were used as the feed to the reactor, which resulted in the production of 19.7 g (dry basis) biochar with a heating value of 28.7 MJ/kg (HHV-dry basis) and a carbon content of 70.9 wt % (dry basis). In this case the biomass energy input is 0.802 MJ and biochar energy output is 0.565 MJ, giving an energy yield of 70.5% and a mass yield of 48.2%.

For the subcritcal water carbonization with biocrude recycling (FIG. 2), biomass (40.8 g-dry basis) and aqueous biocrude were used as the feed to the reactor, which resulted in the production of 24.6 g (dry basis) biochar with a heating value of 29.6 MJ/kg (HHV-dry basis) and a carbon content of 70.9 wt % (dry basis). In this case the biomass energy input is 0.800 MJ and biochar energy output is 0.728 MJ, giving an energy yield of 91% and a mass yield of 60.1%.

Thus, biocrude recycling according to the present invention yielded a higher amount of biomass energy within the biochar, while producing a high quality biochar with high carbon and low oxygen contents.

Example 2

The efficacy of the present invention was again tested in conjunction with the production of biochar from pine forest residue which had an energy content of 19.6 MJ/kg (HHV-dry basis), a carbon content of 45.5 wt % (dry basis), and a moisture content of 50.0 wt %. The conversion was carried out at 240° C. for 30 minutes reaction time using a batch reactor, while keeping the pressure above the vapor pressure of water. After the conversion, product biochar was collected and analyzed.

For the control experiment (without biocrude recycling, FIG. 1), biomass (45.5 g-dry basis) and water were used as the feed to the reactor, which resulted in the production of 27.5 g (dry basis) biochar with a heating value of 26.1 MJ/kg (HHV-dry basis) and a carbon content of 70.0 wt % (dry basis). In this case the biomass energy input is 0.892 MJ and biochar energy output is 0.718 MJ, giving an energy yield of 80.5% and a mass yield of 60.3%.

For the subcritical water carbonization with biocrude recycling (FIG. 2), biomass (45.5 g-dry basis) and aqueous biocrude were used as the feed to the reactor, which resulted in the production of 33.3 g (dry basis) biochar with a heating value of 24.9 MJ/kg (HHV-dry basis) and a carbon content of 70.0 wt % (dry basis). In this case the biomass energy input is 0.892 MJ and biochar energy output is 0.829 MJ, giving an energy yield of 92.9% and a mass yield of 73.2%.

While the claimed invention has been shown and described in example forms, it will be apparent to those skilled in the art that many modifications, additions, and deletions can be made therein without departing from the spirit and scope of the invention as defined by the following claims.

What is claimed is:

1. A method of conversion of a biomass to a biochar, the method comprising:
   a. reacting the biomass in a hydrothermal carbonization apparatus;
   b. separating and collecting products of the biomass reaction, wherein the products include $CO_2$-rich gas, biochar, and biocrude; and
   c. recycling the biocrude back to the hydrothermal carbonization apparatus.

2. The method of claim 1, wherein the hydrothermal carbonization apparatus is a subcritical water reactor.

3. The method of claim 1, wherein the hydrothermal carbonization apparatus is used in batch or continuous mode.

4. The method of claim 1, wherein the mass ratio of the biomass and water/biocrude in the hydrothermal carbonization apparatus is in the range from about 1:3 to about 1:9.

5. The method of claim 1, wherein a raw biomass with about 5-80 wt % moisture is used in the hydrothermal carbonization process.

6. The method of claim 1, wherein the size of a biomass for hydrothermal carbonization is about 1-20 mm long and about 1-10 mm thin.

7. The method of claim 1, wherein the hydrothermal carbonization apparatus is operated at temperatures in the range of about 230 to about 350° C.

8. The method of claim 1, wherein the total residence time of the biomass and water/biocrude in the hydrothermal carbonization apparatus is in the range of about 0.1 to about 5 hours.

9. The method of claim 1, wherein the hydrothermal carbonization apparatus is operated at pressure in the range of about 500 to about 3000 psi.

10. The method of claim 1, wherein the $CO_2$-rich gas is released from an exhaust valve of the hydrothermal carbonization apparatus.

11. The method of claim 1, wherein the biocrude and biochar are separated by a liquid/solid separator.

12. The method of claim 1, wherein the pH of the biocrude for recycling is in the range of about 2 to about 7.

13. The method of claim 1, wherein the organic carbon content of the biocrude for recycling is in the range of about 0.5 to about 10 wt %.

14. A system for converting a biomass to a biochar, the system comprising:
   a. a hydrothermal carbonization apparatus for reacting a biomass and converting the biomass into biochar, biocrude and $CO_2$-rich gas;
   b. an exhaust valve for releasing the $CO_2$-rich gas;
   c. a separator for separating the biochar and the biocrude; and
   d. a fluid line for recycling the biocrude back to the hydrothermal carbonization apparatus.

15. The system of claim 14, wherein the hydrothermal carbonization apparatus is a subcritical water reactor.

16. The system of claim 14, wherein the hydrothermal carbonization apparatus is used in batch or continuous mode.

17. The system of claim 14, wherein the mass ratio of the biomass and water/biocrude in the hydrothermal carbonization apparatus is in the range from about 1:3 to about 1:9.

18. The system of claim 14, wherein a raw biomass with about 5-80 wt % moisture is used in the hydrothermal carbonization process.

19. The system of claim 14, wherein the size of a biomass for hydrothermal carbonization is about 1-20 mm long and about 1-10 mm thin.

20. The system of claim 14, the hydrothermal carbonization apparatus is operated at temperatures in the range of about 230 to about 350° C.

21. The system of claim 14, wherein the total residence time of the biomass and water/biocrude in the hydrothermal carbonization apparatus is in the range of about 0.1 to about 5 hours.

22. The system of claim 14, wherein the hydrothermal carbonization apparatus is operated at pressure in the range of about 500 to about 3000 psi.

23. The system of claim 14, wherein the pH of the biocrude for recycling is in the range of about 2 to about 7.

24. The system of claim 14, wherein the organic carbon content of the biocrude for recycling is in the range of about 0.5 to about 10 wt %.

* * * * *